Patented Oct. 30, 1934

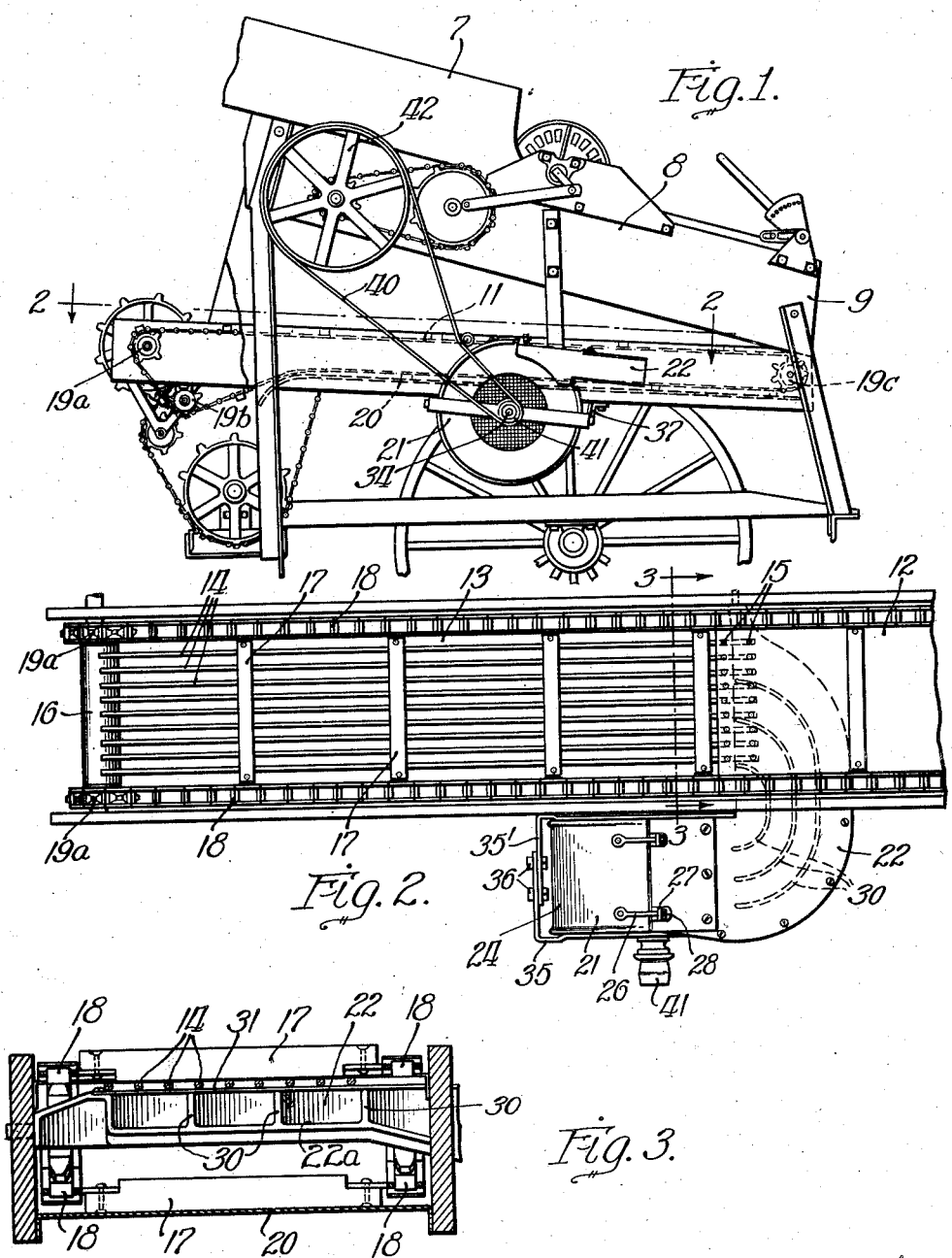

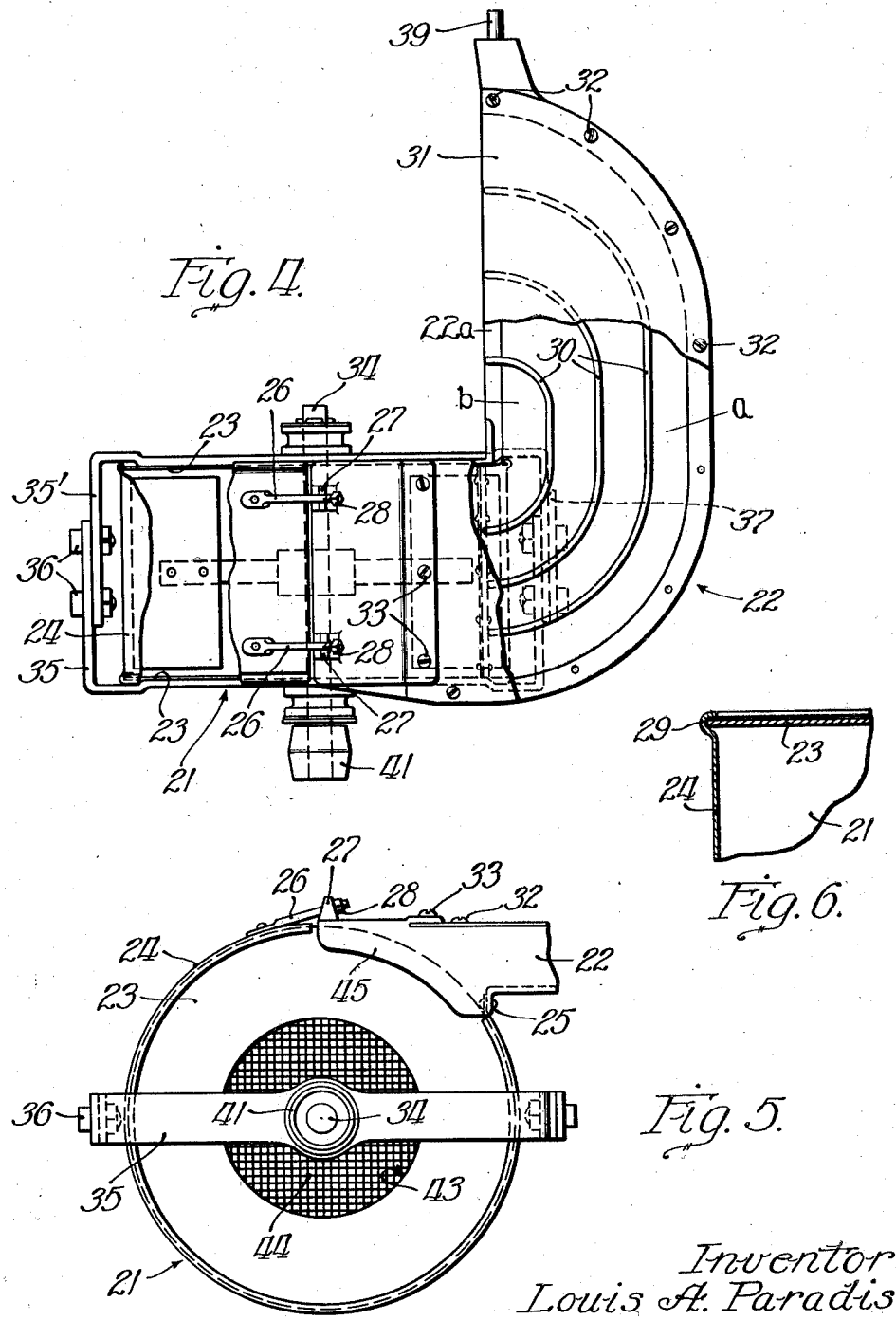

1,978,718

UNITED STATES PATENT OFFICE 1,978,718

BLOWER FOR CORN HARVESTERS

Louis A. Paradise, Moline, Ill., assignor to Deere & Company, Moline, Ill., a corporation of Illinois Original application November 8, 1929, Serial No. 405,600. Divided and this application June 19, 1931, Serial No. 545,435

6 Claims. (Cl. 230—133)

The present invention relates generally to a corn harvester, but is more particularly concerned with a new and improved form of blower associated with the separating and husk-expelling mechanism of the harvester.

The separating mechanism is for the purpose of separating the husks from the residual kernels of corn so as to reclaim the latter, and is of the same construction as that disclosed and described in my copending application Serial No. 405,600, filed November 8, 1929, of which the present case is a division.

The blower is operatively associated with the separating mechanism and its main object is to cooperate therewith to increase the separating efficiency thereof, and to aid in moving the husks and foreign matter to the rear of the machine along the grating of the separating mechanism.

Another of the objects of the present invention is to provide a blower of such a construction that it may be conveniently located relative to the separating and husk-expelling mechanism, and for communication therewith by means of a specially devised duct to perform the functions for which it is utilized. Heretofore it has been customary to locate the fan blower below the husk-expelling mechanism but this location of the blower has been found objectionable inasmuch as rain, dirt and foreign matter falling into the blower from above tend to quickly clog up the fan. To overcome this difficulty, the blower has been constructed with a protecting enclosure therefor, coacting with a U-shaped duct of unique construction which permits the blower to be located to one side of the husk-expelling mechanism, thereby overcoming the former difficulty of clogging.

Another object is to provide a blower of comparatively few, durable and inexpensive parts which are easily assembled and disassembled, and having the protective enclosure readily removable for accessibility for cleaning and repairing the blower mechanism.

A still further object resides in the manner and means of suspending and supporting the blower and also in the particular way in which the blower duct is reinforced to sustain the overhanging weight of the blower mechanism.

Further objects and advantages will hereinafter appear in the following detailed description of a preferred embodiment of my invention, reference being had to the accompanying drawings illustrating such embodiment.

In the drawings:

Figure 1 is a fragmentary side view of a corn harvester embodying a blower constructed in accordance with my present invention;

Figure 2 is a sectional view taken substantially along the line 2—2 of Figure 1, showing the relation of the fan blower to the husk-expelling mechanism;

Figure 3 is a cross-sectional view taken along the line 3—3 of Figure 2;

Figure 4 is an enlarged plan view of the fan blower and its sectionalized air duct, with the covers of the blower and duct partly broken away;

Figure 5 is a side elevational view of the fan blower; and

Figure 6 is a fragmentary sectional view of the fan blower casing showing the construction thereof.

In order that a complete and better understanding of the function of the blower and its location with respect to the corn separating mechanism may be had, a brief description of the corn husker mechanism follows:

Referring to Figure 1, a conveyor 7 is adapted to receive ears of corn, after they are picked, for conveying the ears to the husking rollers located in the chamber 8. The husked ears of corn are discharged from the chamber 8 at 9 on to an elevator (not shown), by which they are conveyed to a point for loading, which is usually a wagon traveling alongside the corn husker. As the ears of corn pass along the husking rollers in chamber 8 the husks fall through the bottom of the chamber 8 on to the table 11, which comprises the separating means for separating any loose corn kernels from the husks and also includes the husk-discharging means. The table or chamber 11, as best shown in Figure 2, has a closed portion 12 and a slatted portion 13 forming a separating grating. The slatted portion is composed of a series of rods 14 of circular cross section, which are secured at one end to the closed portion of the table at 15 and have their free ends resting upon a wooden roller 16 located at the delivery end of the husk-expelling mechanism. This latter mechanism comprises a series of transverse slats 17 carried by side chains 18 providing a means for conveying the husks and other foreign matter along the rods 14. These chains and slats travel over sprocket wheels 19a, 19b and 19c arranged substantially as shown in Figure 1, and may be driven in any suitable manner. Located below the table 11 is a second closed-in table 20 which is adapted to catch the corn kernels which have been broken off during the husking process, and which have dropped out of the chamber 8 with the husks and then through the rods 14 which separate the husks therefrom. In Figures 1 and 3, the chains 18 are shown carrying the slats 17 back over the top side of the lower closed-in table 20 for conveying these kernels of corn to the forward end of the machine so as to drop them upon the same elevator into which the husked corn is dropped. In this manner practically all the kernels which have been broken from the ears in the husking operation are reclaimed and saved.

In order to aid in moving the husks and foreign matter to the rear of the machine along the grating consisting of the rods 14, a fan blower 21 is utilized. This blower 21 is supported by the frame structure of the separating mechanism and is situated at one side thereof, and a sectionalized air duct 22 directs the air discharged from the blower to a point beneath the grating of table 11. In this manner the blast of air from the blower will be sent up through the rods 14, impinging on the husks and foreign matter which is being carried by the rods, and in so doing aids in moving this matter and in separating the kernels therefrom while said husks and foreign matter are being conveyed to the rear of the machine by means of the transverse slats 17.

The preferred construction of the fan blower 21 and the sectionalized discharge duct 22 is clearly illustrated in Figures 3, 4, 5, and 6. The blower 21 comprises two circular side plates 23 which are spaced apart and held secure by means of a rim 24. One end of the rim 24 is riveted to the lower edge of the duct 22 at 25. The other end of the rim 24 is held by the bolts 26 riveted thereto, which engage forked lugs 27 mounted on the top side of the discharge duct 22, and a pair of nuts 28 are utilized to hold the bolts and to draw the rim 24 up under tension upon the side plates 23. The manner in which the side plates 23 are spaced apart and held securely by the rim 24 is best shown in Figure 6. The rim 24 is formed with a bead 29 at each edge thereof which is adapted to receive the peripheral edge of the adjacent side plate 23. With this construction it is a simple matter to clean the blower mechanism, as it requires only the removal of the nuts 28 to gain access thereto.

The blower discharge duct 22 is preferably a casting which is divided into a number of sections or air passageways by means of a series of upstanding flanges or baffle walls 30. The flanges or baffle walls are all substantially of equal height so as to have the top edges thereof disposed in the same plane for supporting a substantially flat cover thereon. The flanges 30 are also variably spaced from one another to vary the cross-sectional areas of the respective air passageways. In Fig. 4 it will be observed that the air passageway $a$ along the outer side of the elbow or duct is of least cross-sectional area, while the inner air passageway $b$ has the largest cross-sectional area. The areas of the intermediate air passageways are graded accordingly between the inner and outer passageways, increasing gradually in area as the inner wall of the elbow or duct is approached. This difference in spacing between the flanges is essential to obtain an even distribution of air over the entire width of the husk separator. It is also to be noted that the outer edge of the bottom wall at the discharge end of the duct is inclined upwardly as at 22a, so that the air which is being discharged from the full width of the duct will be directed upwardly through the bars 14, thereby producing the proper amount of upward draft to aid in the separating of the husks and other foreign matter from the corn kernels.

Not only do the flanges 30 divide the duct into a plurality of air passageways, but they also serve as strengthening ribs to increase the rigidity of the duct and to aid in sustaining a part of, or all of the weight of, the overhanging blower. A removable cover 31 rests upon the top edges of the flanges to enclose the top side of the duct 22 and it is held in place by means of the screws 32 and 33. Whenever duct 22 requires cleaning, cover 31 may readily be removed to expose the air passageways thereof.

The rotor shaft 34 of the blower is supported in bearings carried by two U-shaped brackets 35, 35' which are clamped or bolted together as at 36. These brackets are secured to the table 20 by means of the supports 37, as best shown in Figure 1.

The discharge duct 22 is supported near one end in an opening in the outer side wall of the separating mechanism and connects with the blower at this end, the other end of the duct having a supporting stud 39 which engages in a suitable opening in the inner side wall of the separating mechanism. In this manner the discharge duct 22 is rigidly supported by the separating mechanism, and by reason of such support, the duct aids in supporting the blower.

The blower may be driven in any suitable manner, the drive in the present construction comprising a belt 40 connecting the blower pulley 41 with the pulley wheel 42, the latter being driven from the husker mechanism. The air intake of the blower comprises a suitable opening 43 formed in one of the side plates 23, the opening being suitably covered with a screen 44 to reasonably filter the air and to guard the blower fan against damage.

It is to be noted that the blower end of the duct 22 is provided with depending flanges 45. The latter act as means for centering the blower with respect to the duct, to relieve the rivets at 25 from transverse shearing stresses and to prevent lateral swaying or displacement of the blower as the corn picker is traveling over uneven ground. The flanges 45, when the duct and blower are assembled, project downwardly adjacent the outer faces of the side plates 23 and extend peripherally of the blower over that portion thereof which is not enclosed by the rim 24. This forms an effective seal at the point where the duct and blower join to prevent leakage of air, which, if occurring, would necessarily decrease the volumetric efficiency of the blower and would correspondingly cause a drop in pressure.

Also, the peripheral edges of the side plates 23 which extend into the duct between the flanges 45 will at all times engage the inner face of the top wall of the duct and the inner face of the depending portion of the bottom wall of the duct. Therefore, on tightening up the nuts 28, the two side plates will be secured in axial alignment, or at least they will always occupy the same relative positions with respect to each other and to the duct.

Although the blower has been disclosed and described as used in connection with a corn husker, it may also be used with other implements or devices wherein blowers are employed for similar purposes. Furthermore, the specific construction of the present blower may be varied without departing from the metes and bounds of the present invention, and therefore I do not intend to be strictly limited to the specific construction herein disclosed and described, excepting in so far as the appended claims are so limited.

What I claim is:

1. A blower fan housing comprising a pair of circular side walls, a discharge duct bearing against the margins of said walls over a portion of the periphery thereof, and a flexible rim extending around the remaining portion of the periphery of the walls for securing said duct thereto, said rim being fixed to said duct at one end and adjustably connected to said duct at the other end.

2. The combination of a blower and a discharge duct therefor, means for rigidly supporting said duct, said blower having a housing comprising circular side plates and a rim therefor, said duct having abutting connection only with the outer peripheral edges of said plates, said rim having its one end secured to the duct and its other end adjustably connected therewith, and flanges connected with said duct for engaging the side plates of said housing to center the blower with respect to the duct and to steady said blower.

3. The combination of a blower and a discharge duct therefor, means for rigidly supporting said duct, said blower having a housing comprising circular side plates and a rim therefor, said duct having abutting connection only with the outer peripheral edges of said plates, said rim extending about and enclosing a portion of the periphery of said plates and having its one end secured to the duct and its other end adjustably connected therewith to support the blower from said duct, said duct enclosing the remaining peripheral portion of said plates, and flanges connected with said duct and adapted to project downwardly along the outer faces of said plates to prevent leakage of air at the point where said duct and blower housing join.

4. A fan blower including a housing comprising a pair of circular side members, a discharge duct having abutting engagement with said circular side members, and flexible means connected with said duct and embracing said members for securing the duct to the latter, said flexible means comprising the circumferential portion of said housing.

5. In combination, a blower and a discharge duct, said blower having a housing comprising side plates and a rim embracing the same, said duct having abutting connection only with the outer peripheral edges of said plates, and said rim comprising means for securing said duct in any fixed position relative to said side plates.

6. A blower fan housing comprising a pair of circular side walls, a discharge duct bearing against the margins of said walls over a portion of the periphery thereof, a flexible rim extending substantially around the remaining portion of the periphery of the walls, and tension means adjustably connected with said duct and engaging said rim for securing the duct and the rim to said walls.

LOUIS A. PARADISE.